United States Patent [19]
Vance

[11] Patent Number: 5,288,188
[45] Date of Patent: Feb. 22, 1994

[54] DUNNAGE AIR BAG

[76] Inventor: Robert L. Vance, P.O. Box 656, Sheridan, Ark. 72150

[21] Appl. No.: 877,713

[22] Filed: May 4, 1992

[51] Int. Cl.$^5$ .............................................. B65G 1/14
[52] U.S. Cl. .................... 410/119; 410/125; 414/786; 206/522
[58] Field of Search ............... 410/117, 118, 119, 121, 410/122, 123, 124, 125; 414/786; 206/522; 383/25

[56] References Cited

U.S. PATENT DOCUMENTS

| | | |
|---|---|---|
| 3,028,981 | 4/1962 | Ford et al. |
| 3,072,270 | 1/1963 | Tolby . |
| 3,442,402 | 5/1969 | Baxter ................... 410/119 |
| 3,506,143 | 4/1970 | Evans . |
| 3,554,135 | 1/1971 | Duvall ................... 410/119 |
| 3,667,625 | 6/1972 | Lucas ................... 410/119 |
| 4,136,788 | 1/1979 | Robbins ................... 410/119 |
| 4,591,519 | 5/1986 | Liebel . |

Primary Examiner—David A. Bucci
Assistant Examiner—James T. Eller, Jr.
Attorney, Agent, or Firm—Boyd D. Cox

[57] ABSTRACT

A dunnage air bag is formed from two rectangular sheets. Each sheet is formed by a polyethylene layer adhesively bonded to a liner board layer. An air valve is mounted through one of the sheets to enable the dunnage air bag to be selectively filled with air. The sheets are disposed in overlying offset relation, with the polyethylene faces of the sheets in contact. A rectangular bladder is created by heat welding the polyethylene layers together, through the liner board layer, in a rectangular heat weld. Offset flaps of the sheets are then folded over on fold lines disposed interiorly of the heat weld and adhesively secured in order to reinforce the bladder and minimize stress on the heat weld. In alternative constructions, the polyethylene layer may be dimensionally smaller than the liner board layer such that a strip of liner board remains exposed along one or more peripheral edges of the polyethylene face of the laminate sheet. Consequently, subsequent folding and adhesive securement of the offset flaps during manufacture of the dunnage air bag results in liner board to liner board adhesive bonds rather than liner board to polyethylene adhesive bonds.

18 Claims, 5 Drawing Sheets

DUNNAGE AIR BAG

BACKGROUND OF THE INVENTION

1. Field Of The Invention

The present invention relates to dunnage air bags, and more particularly pertains to an improved dunnage air bag of the type employed in the packaging and shipping of various articles and materials for the purpose of filling void air space to prevent shifting of the load and damage to goods.

2. Description Of The Prior Art

U.S. Pat. No. 3,028,981, which issued to B. Ford et al. on Apr. 10, 1962, discloses a dunnage air bag which utilizes a polyethylene film to form a balloon with an expansion bellows disposed between semi-rigid corrugated boards. U.S. Pat. No. 3,072,270, which issued to T. Tolby on Jan. 8, 1963, discloses a similar inflatable cargo cushion which employs a separable inflatable bladder formed by polyethylene film, which is disposed within a paper or cardboard bag. U.S. Pat. No. 3,506,143, which issued to C. Evans on Apr. 14, 1970, discloses an inflatable dunnage bag possessing an air bladder enclosed in a multi-ply container. U.S. Pat. No. 4,591,519, which issued to H. Liebel on May 27, 1986, discloses an inflatable cargo bag possessing two overlying relatively stiff paperboard sheets disposed on opposite sides of a separate plastic air bladder, such that the bag is substantially self-supporting in an un-inflated condition. Peripheral edge flaps on one larger sheet are folded over and glued to the other sheet.

These prior art inflatable dunnage bags suffer from several disadvantages. The separate manufacture and insertion of the air bladder is relatively expensive. Also, during insertion, the bladder can be nicked, cut, torn, or abraded, resulting in failure of the bag upon attempted inflation. Prior art bags which utilize a bladder inserted into a paper tube require expensive machines to form the paper tubes. Nonrigid type prior art dunnage bags collapse when un-inflated, making them difficult for one person to position and hold during inflation. The use of non-integral air bladders also creates the potential for the air bladder to sag, fold and crease within the outer container, leading to ultimate failure of the bag.

SUMMARY OF THE INVENTION

In order to overcome the deficiencies of the prior art dunnage air bags described above, the present invention provides an improved dunnage air bag which is formed from two rectangular sheets. Each sheet is formed by a polyethylene layer adhesively bonded to a liner board layer. An air valve is mounted through one of the sheets to enable the dunnage air bag to be selectively filled with air. The sheets are disposed in overlying offset relation, with the polyethylene faces of the sheets in contact. A rectangular bladder is created by heat sealing the polyethylene layers together, through the liner board layer, in a rectangular heat weld. Offset flaps of the sheets are then folded over on fold lines disposed interiorly of the heat weld and adhesively secured in order to reinforce the bladder and minimize stress on the heat weld. In alternative constructions, the polyethylene layer may be dimensionally smaller than the liner board layer such that a strip of liner board remains exposed along one or more peripheral edges of the polyethylene face of the laminate sheet. Consequently, subsequent folding and adhesive securement of the offset flaps during manufacture of the dunnage air bag results in liner board to liner board adhesive bonds rather than liner board to polyethylene adhesive bonds.

The liner board layers of the dunnage air bag result in a relatively stiff self-supporting construction, allowing a single individual to easily position and inflate the bag for use. The lamination of the bladder to the liner board layers results in a stronger construction, and eliminates the potential of damage to the bladder during insertion, as well as allowing use of less expensive grades of liner board. The integral construction of the bladder also prevents sagging of the bladder, which can lead to bag failure in prior art bags with separable inserted bladders.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE PREFERRED EMBODIMENT(S)

Figure 1:
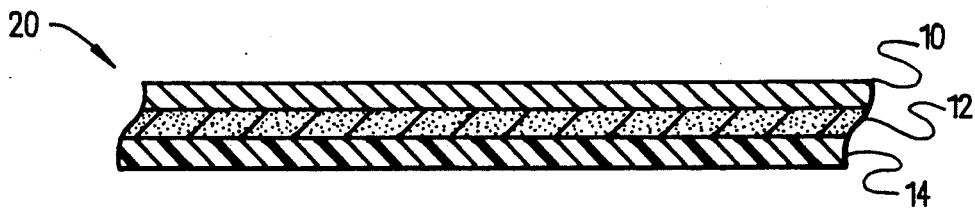
FIG. 1 is a cross-sectional view illustrating the construction of a laminated liner-board and polyethylene sheet used in the dunnage air bag of the present invention.

Referring now to the drawings, wherein like reference numerals designate corresponding structure throughout the views, and referring in particular to FIG. 1, a laminated sheet 20 used in the construction of the improved dunnage air bag according to a preferred embodiment of the invention includes a semi-rigid liner board layer 10 secured to a flexible polyethylene film layer 14 by an adhesive 12. In the context of the present invention, the term laminate refers to a two-layer material which may be formed by bonding two discrete sheets or by depositing a second layer on a first discrete sheet. The liner board layer 10 is a high fiber content paper, preferably a 69 pound liner board material which is widely available from a number of paper manufacturing companies. The layer 10 may also be formed with a multi-ply construction, without departing from the scope of the present invention. The adhesive 12 may be a variety of conventional compositions, with one preferred adhesive being low density polyethylene resin which is widely available from a number of chemical manufacturing companies. The polyethylene film layer 14 is preferably linear, low density, low air permeability polyethylene, which is also widely available from a number of chemical manufacturing companies. The thickness of the film layer 14 is preferably approximately 4 mils. However, it should be noted that when polyethylene resin is used as the adhesive 12, then the combination of the thickness of the resin layer plus the thickness of the film layer 14 is preferred to be approximately 4 mils. For example, a 1 mil layer of molten resin could be extruded onto the liner board layer 10 and a 3 mil film layer 14 be applied thereto to create a combined thickness of 4 mils.

Figure 2:
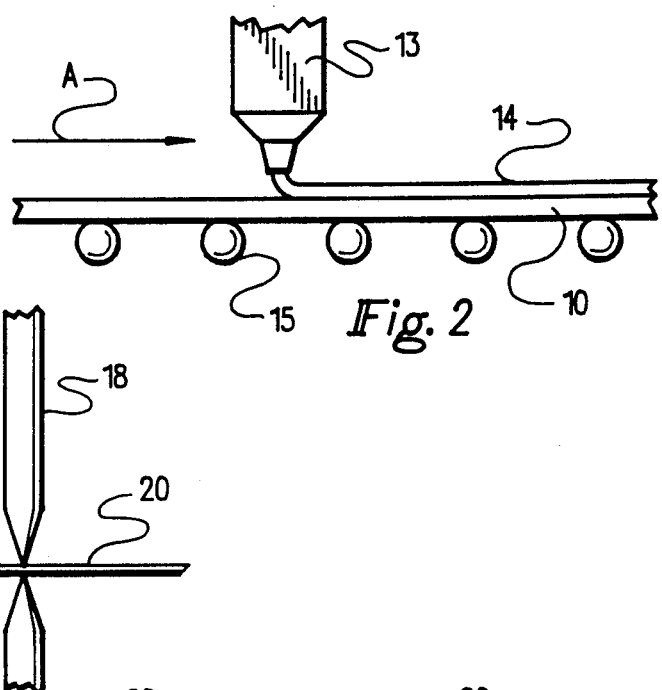
FIG. 2 is a side elevational view illustrating the extrusion of a polyethylene layer on a liner-board sheet for use in the manufacture of the dunnage air bag of the present invention.

It should also be noted that an added benefit is derived when molten polyethylene resin is extruded onto the liner board layer 10 and the polyethylene film layer 14 is applied thereto. Occasionally, small holes, known as pin holes, will be formed in polyethylene film during its manufacture. Obviously, such type film is undesirable for the present application because such film would allow air to readily escape through the pin holes in the film. When molten polyethylene resin is first extruded onto the liner board 10 and the polyethylene film layer 14 is applied thereto, the resin tends to fill the unwanted pin holes and prevent air from escaping therethrough. In addition, it should also be noted that the entire polyethylene film layer 14 can be created by applying the desired thickness of polyethylene resin to the liner board layer 10. FIG. 2 illustrates an example of this method, in which the liner board sheet 10 is fed along conveyor rollers 15 in the direction of arrow A while an extruder 13 applies a molten polyethylene resin which subsequently cools and sets to form the polyethylene film layer 14 on the top surface of the liner board 10.

Laminated sheets of the type described are available from paper conversion companies such as Ludlow Corporation located in Homer, La. A preferred laminated sheet produced by Ludlow Corporation is designated as 69# Kraft Linerboard/14.4# low density polyethylene/3 mil linear low density polyethylene film.

Figure 3:
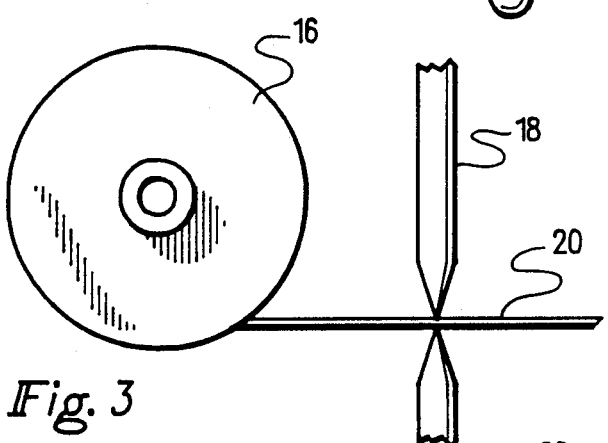
FIG. 3 is a side elevational view illustrating the severing of a selected length of a laminated sheet from a roll in the process of making the dunnage air bag of the present invention.

The laminated sheet 20 is preferably wound on a large roll 16, and severed into predetermined lengths by conventional web handling equipment including a shear 18, as shown in FIG. 3.

Figure 4:
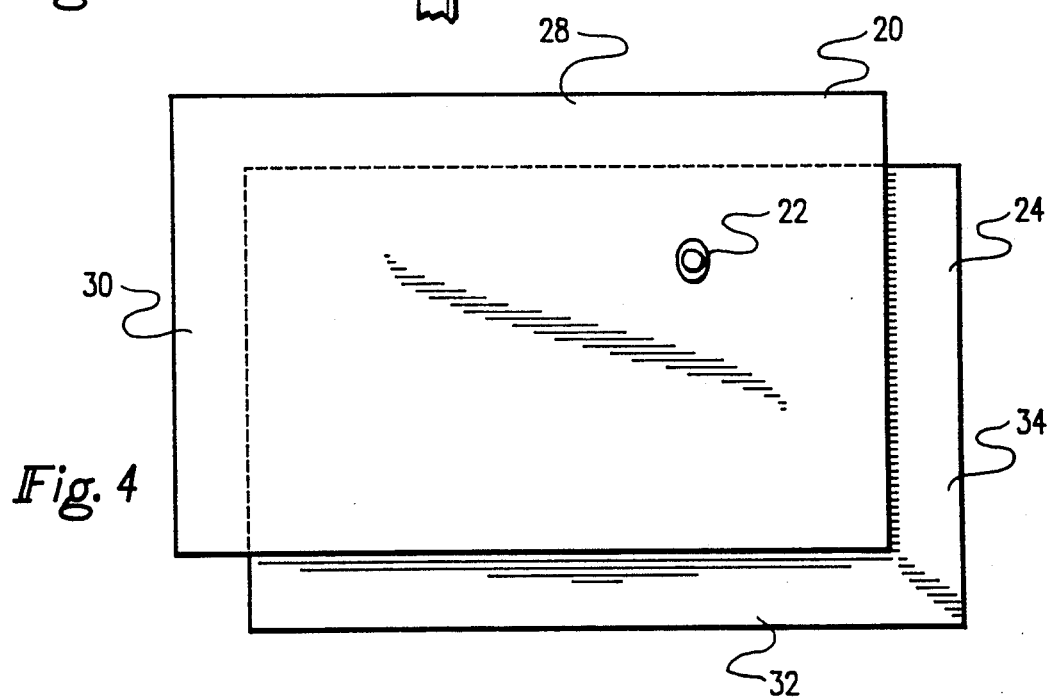
FIG. 4 is a top plan view illustrating two offset overlying sheets used in the process of making the dunnage air bag of the present invention.

Two identical rectangular sheets 20 and 24 are placed in offset overlying relation as shown in FIG. 4. The offset disposition of the sheets 20 and 24 creates two transverse peripheral flaps 28 and 30 on the top sheet 20, and two similar transverse flaps 32 and 34 on the bottom sheet 24. The sheets 20 and 24 are disposed with the polyethylene faces 14 (FIG. 1) facing each other such that the upper surface of the top sheet 20 is the liner board layer 10 (FIG. 1), and the upper surface of the bottom sheet 24 is the polyethylene layer 14. A conventional air valve 22 is mounted through the sheet 20, adjacent one corner, as illustrated. The air valve 22 may be a conventional spring biased check valve, of the type used in inner tubes and vehicle tires, and is for the purpose of inflating the dunnage air bag. The air valve 22 may be heat welded or adhesively secured to the sheet 20.

Figure 5:
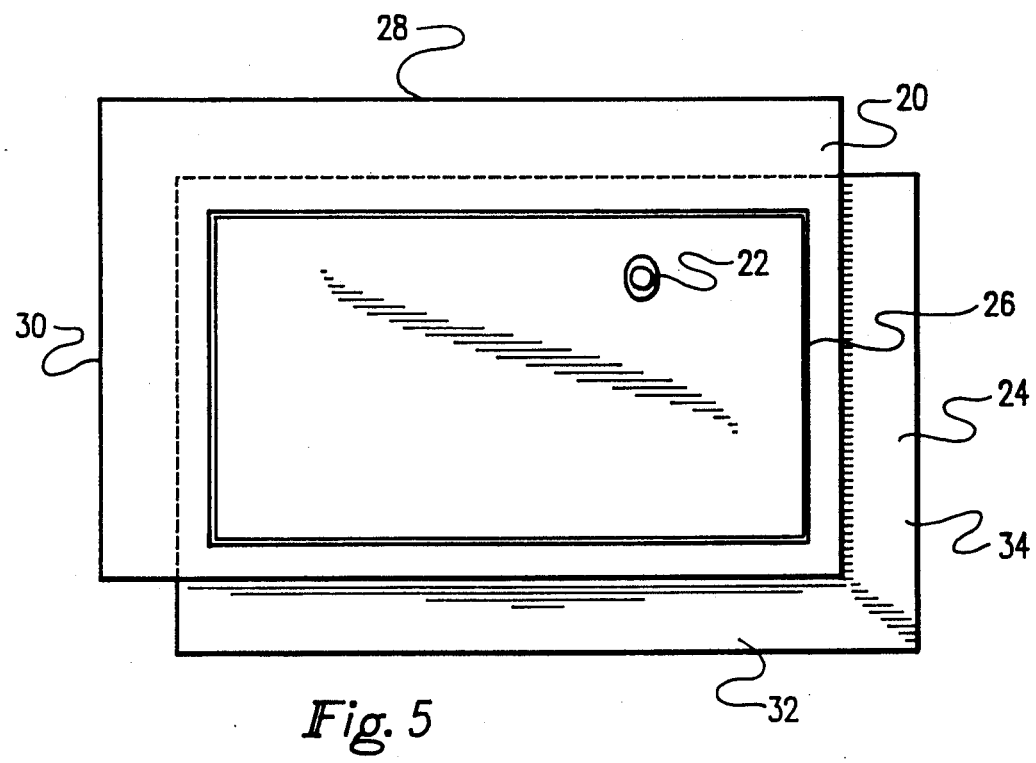
FIG. 5 is a top plan view illustrating the heat sealing of the two overlying sheets to form an air-tight bladder in the process of making the dunnage air bag of the present invention.
Figure 6:
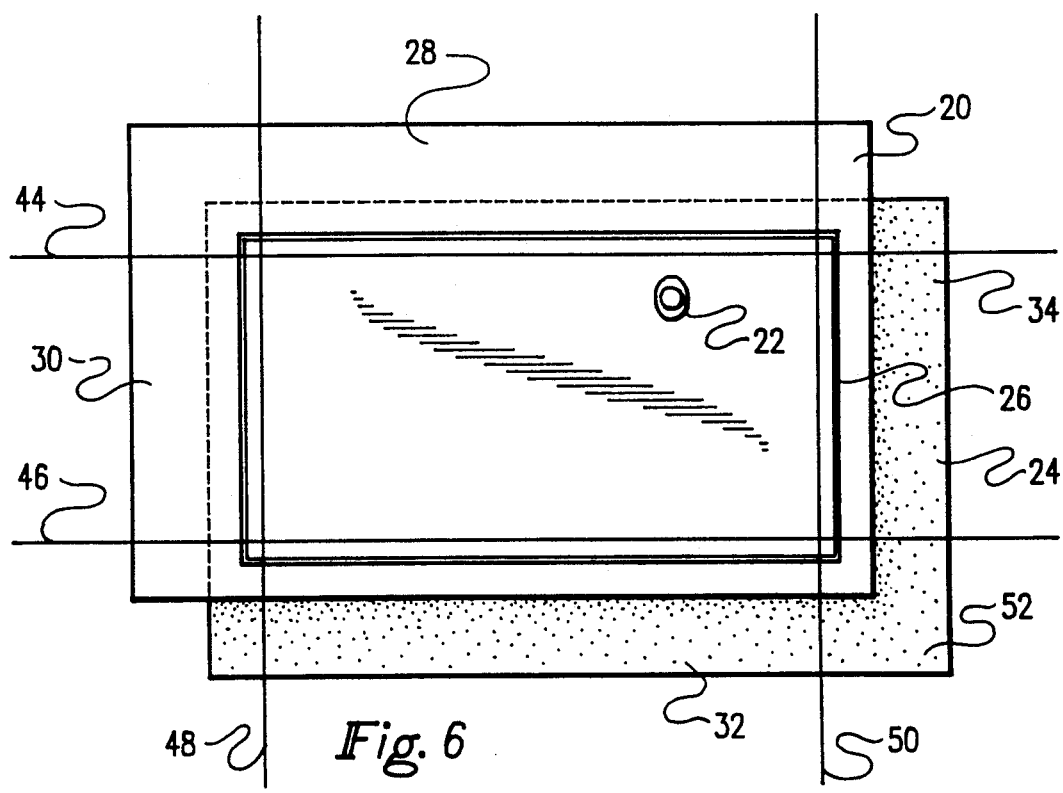
FIG. 6 is a top plan view illustrating the manner of folding and adhesively securing peripheral edge flap portions of the offset overlying sheets in the process of making the dunnage air bag of the present invention.
Figure 7:
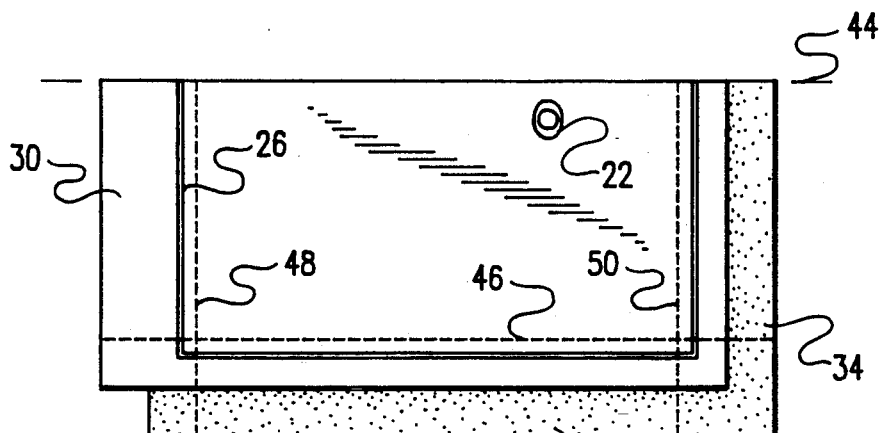
FIG. 7 is a top plan view illustrating the overlying sheets after completion of a first downward fold along fold line 44.
Figure 8:
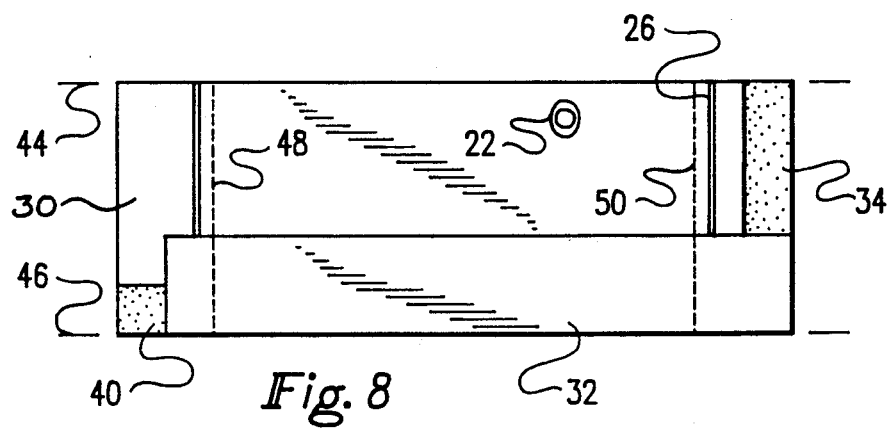
FIG. 8 is a top plan view illustrating the overlying sheets after completion of a second upward fold along fold line 46.
Figure 9:
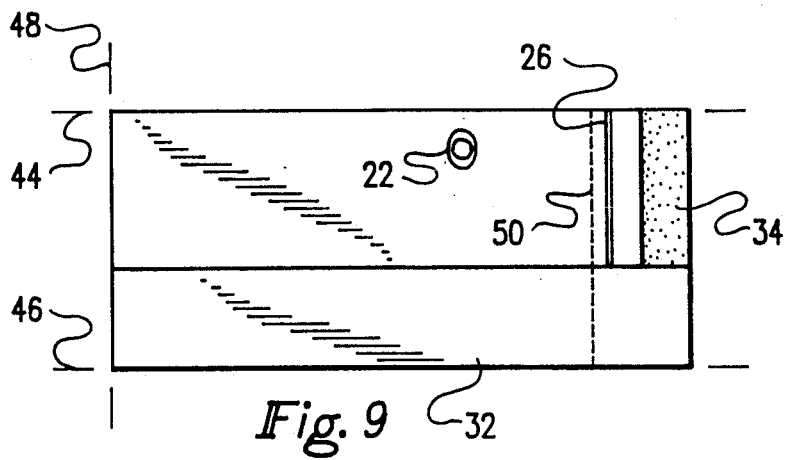
FIG. 9 is a top plan view illustrating the overlying sheets after completion of a third downward fold along fold line 48.
Figure 10:
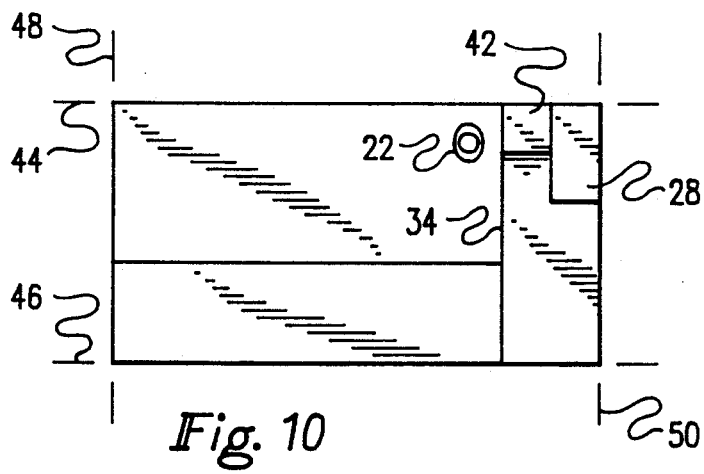
FIG. 10 is a top plan view illustrating the completed dunnage air bag of the present invention, after completion of a fourth upward fold along fold line 50.

As shown in FIG. 5, a rectangular frame heat weld 26 is formed by conventional heat welding equipment, securing the polyethylene faces of the sheets 20 and 24 together, and forming an enclosed rectangular air bladder communicating with valve 22. The heat weld 26 is formed within the overlying zone of the sheets 20 and 24, leaving the peripheral flap edge portions of the sheets 20 and 24 free. As an alternative to securing the polyethylene faces of the sheets 20 and 24 by heat welding, it is contemplated that suitable adhesives or radio frequency heating techniques may be employed As shown in FIG. 6, after heat welding, the peripheral flap portions 28, 30, 32 and 34 of the sheets 20 and 24 are adapted to be folded over along respective fold lines 44, 48, 46 and 50 and secured by an adhesive 52. One suitable adhesive is of the hot melt type produced by Swift Adhesives, a Division of Reichhold Chemicals, Inc. located in Dallas, Tex. The fold lines 44, 46, 48 and 50 are disposed interiorly of the rectangular frame heat weld 26, for the purpose of minimizing the stress exerted on the heat weld 26 by air pressure within the bladder during use of the dunnage air bag. As shown in FIG. 7, the bottom surface of the peripheral flap 28 of the top sheet 20 is folded downwardly along fold line 44 over the bottom sheet 24. Next, as shown in FIG. 8, peripheral flap 32 of the bottom sheet 24 is folded upwardly along fold line 46. Due to the initial offset orientation of the sheets 20 and 24, these folding operations create longitudinally extending shorter over-folded peripheral flaps, one of which is shown at 40 in FIG. 8, and the other of which is shown (after subsequent folding operations) at 42 in FIG. 10. In the next step, shown in FIG. 9, peripheral flap 30 of top sheet 20 is folded downwardly along fold line 48 and adhesively secured. In the final folding step, illustrated in FIG. 10, peripheral flap 34 on the bottom sheet 24 is folded upwardly along fold line 50 and adhesively secured. The folding operations along lines 48 and 50 also create shorter over-folded flaps (not shown) due to the initial offset relation of the sheets 20 and 24. As may now be appreciated, particularly with reference to FIG. 6, the polyethylene faces of flaps 28 and 30 of the top sheet 20 will be glued to the liner board face of the bottom sheet 24, and the polyethylene faces of flaps 32 and 34 of the bottom sheet 24 will be glued to the liner board face of the top sheet 20. It should be noted that some overlapping of the peripheral flaps will, of course, occur in the corner regions. The completed dunnage bag shown in FIG. 10 may be rolled, folded or stacked for storage purposes, and inflated for use.

The preferred specific sequential folding operations described above are intended to be illustrative only; the peripheral flaps 28, 30, 32 and 34 may be folded in any order within the intended scope of the present invention.

Figure 11:
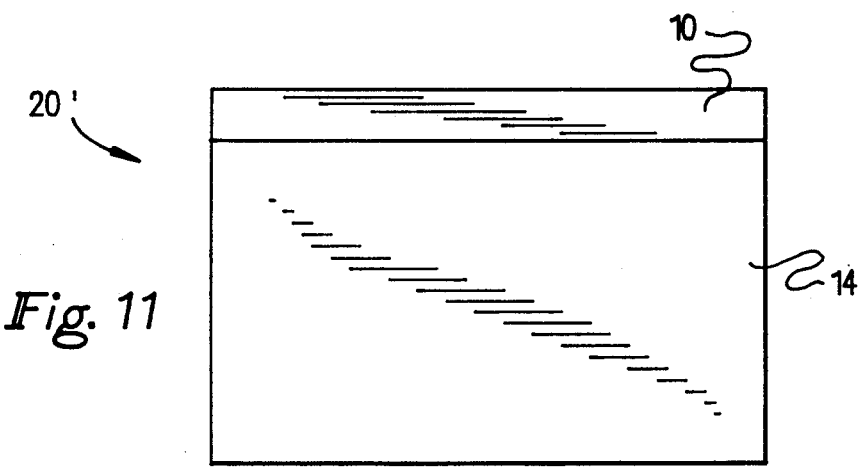
FIG. 11 is a top plan view illustrating the polyethylene face of a laminate polyethylene and liner board sheet according to a second embodiment of the present invention, which includes an exposed liner board strip extending along one longitudinal edge.
Figure 12:
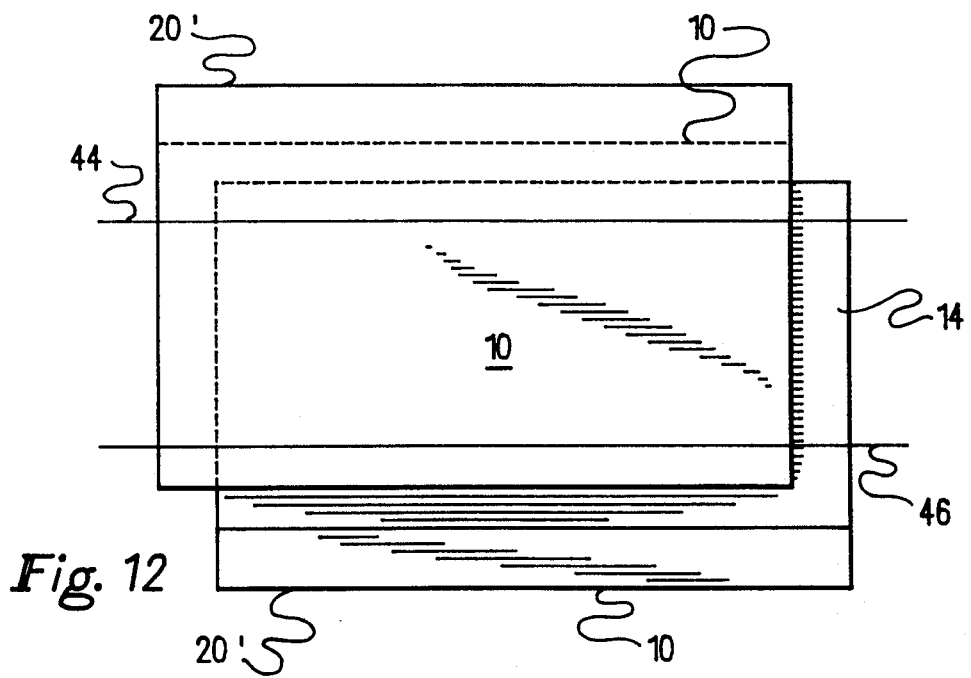
FIG. 12 is a top plan view illustrating two laminate sheets according to FIG. 11 disposed in offset overlying relation, prior to completion of subsequent folding and adhesive securing of peripheral flap portions.

It should also be noted that the laminate polyethylene and liner board sheets 20 can be manufactured such that the polyethylene film layer 14 does not extend onto the flaps 28, 30, 32 and 34. When such is the case and the flaps are glued to liner boards as described above, liner board is being glued to liner board (rather than polyethylene film being glued to liner board) which can result in a superior adhesive bond between the flaps and the sheets to which they are glued. Also, selective flap areas may be manufactured without a polyethylene film covering, while others may be manufactured with such type covering. For example, in a preferred embodiment of the present invention depicted in FIG. 11, the laminated sheet 20' may be manufactured such that a lengthwise strip having the approximate width of flaps 28 and 32 is left uncovered by the polyethylene film layer 14. Then at such time as identical rectangular sheets 20' are cut from the roll 16 (FIG. 3), they may be placed in offset overlying relation, as shown in FIG. 12, such that the uncovered strip will be at the top of the top sheet 20' coinciding with flap 28 and at the bottom of the bottom sheet 20' coinciding with flap 32. Hence, when the uncovered strip coinciding to flap 28 is glued to the bottom sheet 20' and the uncovered strip coinciding to flap 32 is glued to the top sheet 20', a liner board surface is being glued to another liner board surface, which, as stated before, can result in a superior adhesive bond.

Figure 13:
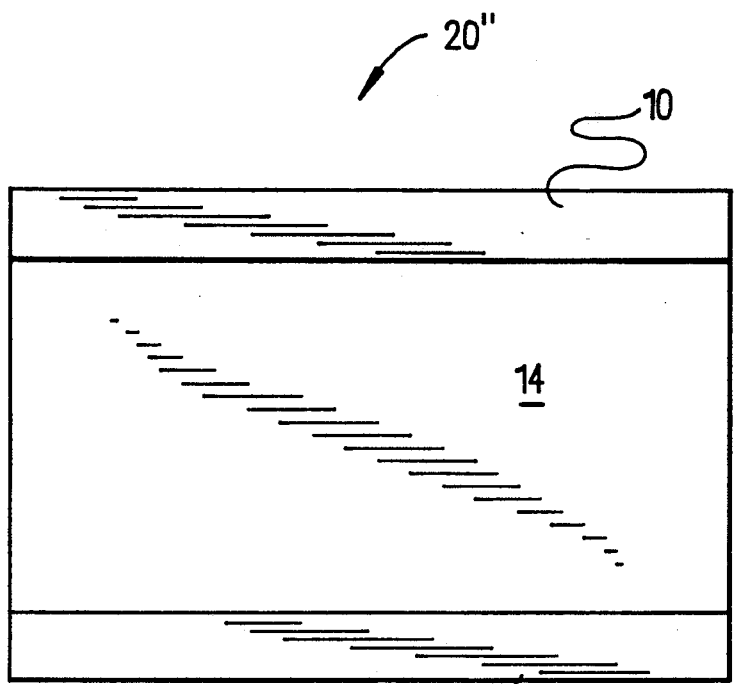
FIG. 13 is a top plan view illustrating the polyethylene face of a laminate polyethylene and liner board sheet according to a third embodiment of the present invention, which includes an exposed liner board strip extending along two opposite longitudinal edges.

FIG. 13 illustrates a further example of this construction principle, in which liner board material 10 is left exposed along both opposite longitudinal edges of the polyethylene face 14 of the sheet 20''.

Figure 14:
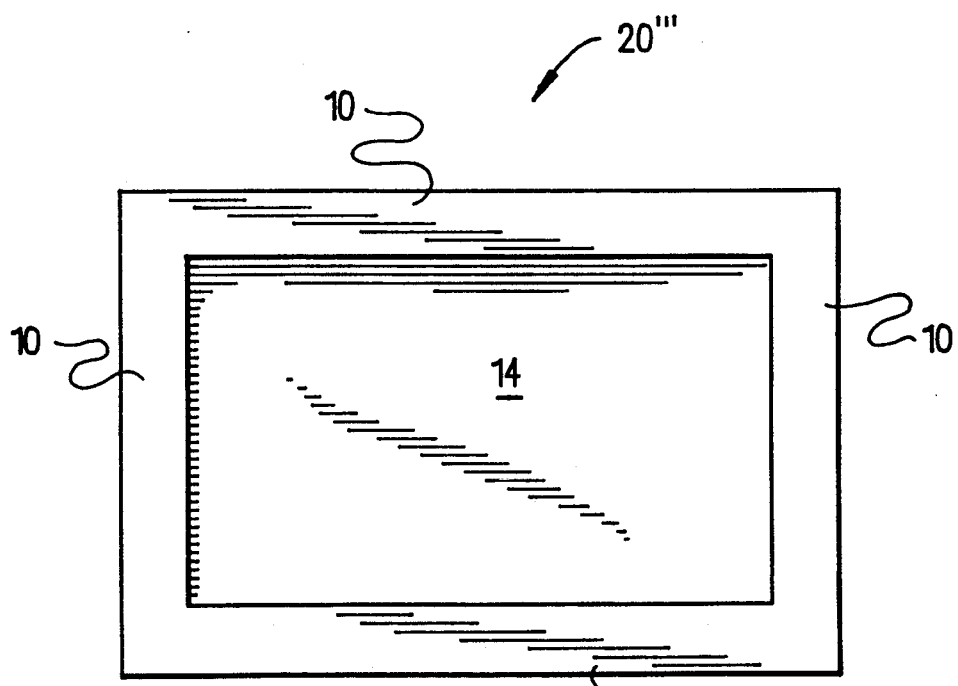
FIG. 14 is a top plan view illustrating the polyethylene face of a laminate polyethylene and liner board sheet according to a fourth embodiment of the present invention, which includes an exposed liner board strip extending along all four peripheral edges.

FIG. 14 illustrates still another example, in which liner board material 10 is left exposed along all four peripheral edges of the polyethylene face 14 of the sheet 20'''.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A dunnage air bag, comprising:
   first and second sheets each formed by a semi-rigid layer laminated to a substantially air impervious flexible film layer;
   said first and second sheets at least partially disposed in offset overlying relation, with said film layers of said first and second sheets facing each other;
   means securing portions of said film layers of said first and second sheets together within an overlying zone of said first and second sheets forming a sealed perimeter to define an enclosed air bladder;
   valve means on one of said sheets connected to said bladder to allow selective inflation;
   each of said sheets possessing peripheral flap portions;
   said peripheral flap portions of each of said sheets folded over the other of said sheets along lines interior of said sealed perimeter; and
   means securing said peripheral flap portions to the other of said two sheets.

2. The dunnage air bag of claim 1, wherein said semi-rigid layer is formed by liner board.

3. The dunnage air bag of claim 1, wherein said flexible film layer is formed by polyethylene.

4. The dunnage air bag of claim 1, wherein said means securing portions of said film layers comprises heat welds.

5. The dunnage air bag of claim 1, wherein said means securing portions of said film layers comprises an adhesive.

6. The dunnage air bag of claim 1, wherein said means securing said peripheral flap portions to the other of said sheets comprises an adhesive.

7. The dunnage air bag of claim 1, wherein said film layers are secured along portions defining a rectangular bladder.

8. The dunnage air bag of claim 1, wherein said flexible film layer does not entirely cover a surface of said semi-rigid layer, such that a strip of said semi-rigid layer remains exposed along at least one peripheral edge of a flexible film layer face of at least one of said first and second sheets.

9. A dunnage air bag, comprising:
   first and second sheets each formed by a liner board layer laminated to a polyethylene film layer;
   said first and second sheets disposed in offset overlying relation, with polyethylene film layers of said first and second sheets facing each other;
   a rectangular heat weld securing portions of said polyethylene film layers of said first and second sheets together to define a rectangular air bladder;
   valve means on one of said sheets connected to said bladder to allow selective inflation;
   each of said sheets possessing two transverse peripheral flaps; and
   said peripheral flaps of each of said sheets folded over the other of said sheets along lines interior of said rectangular heat weld and secured to the other of said two sheets.

10. The dunnage air bag of claim 9, wherein said polyethylene film layer does not entirely cover a surface of said liner board layer, such that a strip of said liner board layer remains exposed along at least one peripheral edge of a polyethylene film layer face of at least one of said first and second sheets.

11. A method of making a dunnage air bag, comprising the steps of:
providing first and second sheets each formed from a semi-rigid layer laminated to a flexible substantially air impervious film layer;
mounting an air valve through one of said sheets;
disposing said first and second sheets in at least partially overlying relation, with said film layers of said first and second sheets facing each other;
securing portions of said film layers together within an overlying zone of said first and second sheets forming a sealed perimeter to form an air bladder; and
folding peripheral flap portions on at least one of said sheets over the other of said sheets along lines interior of said perimeter and securing said peripheral flap portions to said other of said sheets.

12. The method of claim 11, wherein said step of disposing said first and second sheets in at least partially overlying relation includes the step of positioning said sheets in offset relation such that each sheet has two transverse peripheral flap portions.

13. The method of claim 12, further comprising the step of folding said peripheral flap portions on each of said sheets over the other of said sheets and securing thereto.

14. The method of claim 11, wherein said step of securing portions of said film layers includes the step of heat welding portions of said film layers.

15. The method of claim 11, wherein said step of securing portions of said film layers includes the step of securing rectangular portions of said film layers to define a rectangular bladder.

16. The method of claim 11, wherein said step of providing first and second sheets each formed from a semi-rigid layer laminated to a flexible substantially air-impervious layer comprises the step of forming said semi-rigid layer from liner board.

17. The method of claim 11, wherein said step of providing first and second sheets each formed from a semi-rigid layer laminated to a flexible substantially air-impervious layer comprises the step of forming said flexible film layer from polyethylene.

18. The method of claim 11, wherein said flexible film layer does not entirely cover a surface of said semi-rigid layer, such that a strip of said semi-rigid layer remains exposed along at least one peripheral edge of a flexible film layer face of at least one of said first and second sheets.

* * * * *